United States Patent [19]

Quin

[11] Patent Number: 4,630,527
[45] Date of Patent: Dec. 23, 1986

[54] ELECTRO-HYDRAULIC HEIGHT CORRECTOR FOR MOTOR VEHICLES

[75] Inventor: Philippe P. Quin, Vincennes, France

[73] Assignees: Automobiles Citroen, Neuilly; Automobiles Peugeot, Paris, both of France

[21] Appl. No.: 634,762

[22] Filed: Jul. 26, 1984

[30] Foreign Application Priority Data

Jul. 27, 1983 [FR] France ............................. 83 12746

[51] Int. Cl.[4] ............................................ F15B 11/08
[52] U.S. Cl. ..................................... 91/449; 91/454; 137/879; 137/881; 251/77; 280/714
[58] Field of Search .................... 280/714, DIG. 1; 251/76, 77, 129; 137/879, 881, 882; 91/449, 451, 452, 454

[56] References Cited

U.S. PATENT DOCUMENTS

| 2,926,882 | 3/1960 | Russell | 251/30 |
|---|---|---|---|
| 2,976,053 | 3/1961 | Pribonic et al. | 280/714 |
| 2,980,139 | 4/1961 | Lynn | 251/77 |
| 3,057,160 | 10/1962 | Russell et al. | 91/451 |
| 4,266,790 | 5/1981 | Vemura et al. | 280/714 |
| 4,318,332 | 3/1982 | Shingu et al. | 91/454 |
| 4,401,009 | 8/1983 | Zeuner et al. | 91/449 |
| 4,462,610 | 7/1984 | Saito et al. | 280/714 |

FOREIGN PATENT DOCUMENTS 756118  8/1980  U.S.S.R. ................. 91/451

Primary Examiner—James C. Yeung
Assistant Examiner—Noah Kamen
Attorney, Agent, or Firm—Karl F. Ross; Herbert Dubno

[57] ABSTRACT

An electro-hydraulic height corrector for motor vehicles comprising a hydraulic distributor having ducts connected, one to a pressurized supply source, another to suspension cylinders and another to an exhaust circuit, and means for connecting these different ducts together, and means sensitive to the position of the suspended part of the vehicle with respect to the none suspended part thereof. In accordance with the invention, the distributor comprises two slide valves each connected to the core of an electromagnet, one being inserted in the circuit connecting the intake duct to an exhaust duct and the other in the circuit connecting the user duct to an exhaust duct and which are subjected to the action of resilient means tending to return the first slide valve to a position in which communication between the intake and user ducts is established and the second slide valve to a position in which communication between the user and the exhaust ducts is interrupted and a ball valve which is subjected to the action of resilient return means and is inserted in a circuit connecting the intake duct and the user duct together.

2 Claims, 3 Drawing Figures

ELECTRO-HYDRAULIC HEIGHT CORRECTOR FOR MOTOR VEHICLES

FIELD OF THE INVENTION

The present invention relates to an electro-hydraulic height corrector for a motor vehicle, of the kind which is sensitive to the position of the suspended part of the vehicle with respect to the nonsuspended part and comprising means for permanently correcting the instantaneous position of the suspended part with respect to a mean position.

BACKGROUND OF THE INVENTION

Height correctors of this kind generally comprise a hydraulic distributor comprising ducts connected, one to a pressurized supply source, another to the suspension cylinders and another to a fluid-return circuit, and means for connecting these different ducts together.

OBJECT OF THE INVENTION

The object of the invention is to provide a height corrector with a distributor, in which this element is particularly simple and efficient.

SUMMARY OF THE INVENTION

In the height corrector of the invention the distributor comprises two slide valves each connected to the core of an electromagnet, one being inserted in the circuit connecting the intake duct to a return duct and the other in the circuit connecting the user duct to an exhaust duct, and they are subjected to the action of resilient means tending to return the first slide to a position in which communication between the intake and the user duct is established and the second slide to a position in which communication between the user duct and the return duct is cut off, and a ball valve which is subjected to the action of resilient return means and is inserted in a circuit connecting the intake duct and the user duct together.

In the rest position, the intake duct is connected to the return duct whereas the user duct is isolated therefrom. When the first electromagnet is energized, the intake duct is isolated from the exhaust duct; the pressure in the intake duct rises so that the ball valve opens and the intake duct is placed in communication with the user duct. The suspended part of the vehicle rises. Similarly when the second electromagnet is energized, the user duct is placed in communication with the exhaust duct and the vehicle is lowered.

In an advantageous embodiment of the invention, the core of each electromagnet is connected to the corresponding slide valve by a lost motion connection and the resilient return means act on the core. Thus, when an electromagnet is energized, its core begins to move, while partially compressing its resilient return means, gains momentum and then drives the slide valve by exerting an impact thereon and completing the compression of the resilient return means; this impact unjams the slide valve if it was jammed.

The resilient return means may for example bear against a cup which is controlled by the core of the electromagnet and cooperates with the first stop integral with the slide-valve, a second stop integral with this slidevalve cooperating with a fixed element of the distributor so as to limit the travel of the slide-valve and to maintain, in the rest position, a certain clearance between the end of said slide valve and the core of the electromagnet.

The first stop may be formed by a washer engaged in a groove of the slide-valve and movable inside the cup. Similarly, the second stop may also be formed by a washer engaged in a groove of the slide-valve and movable inside a chamber formed in the fixed part of the distributor.

BRIEF DESCRIPTION OF THE DRAWING

One embodiment of the distributor for a height corrector in accordance with the invention is described hereafter by way of example with reference to the accompanying drawing in which.

SPECIFIC DESCRIPTION

Figure 1:
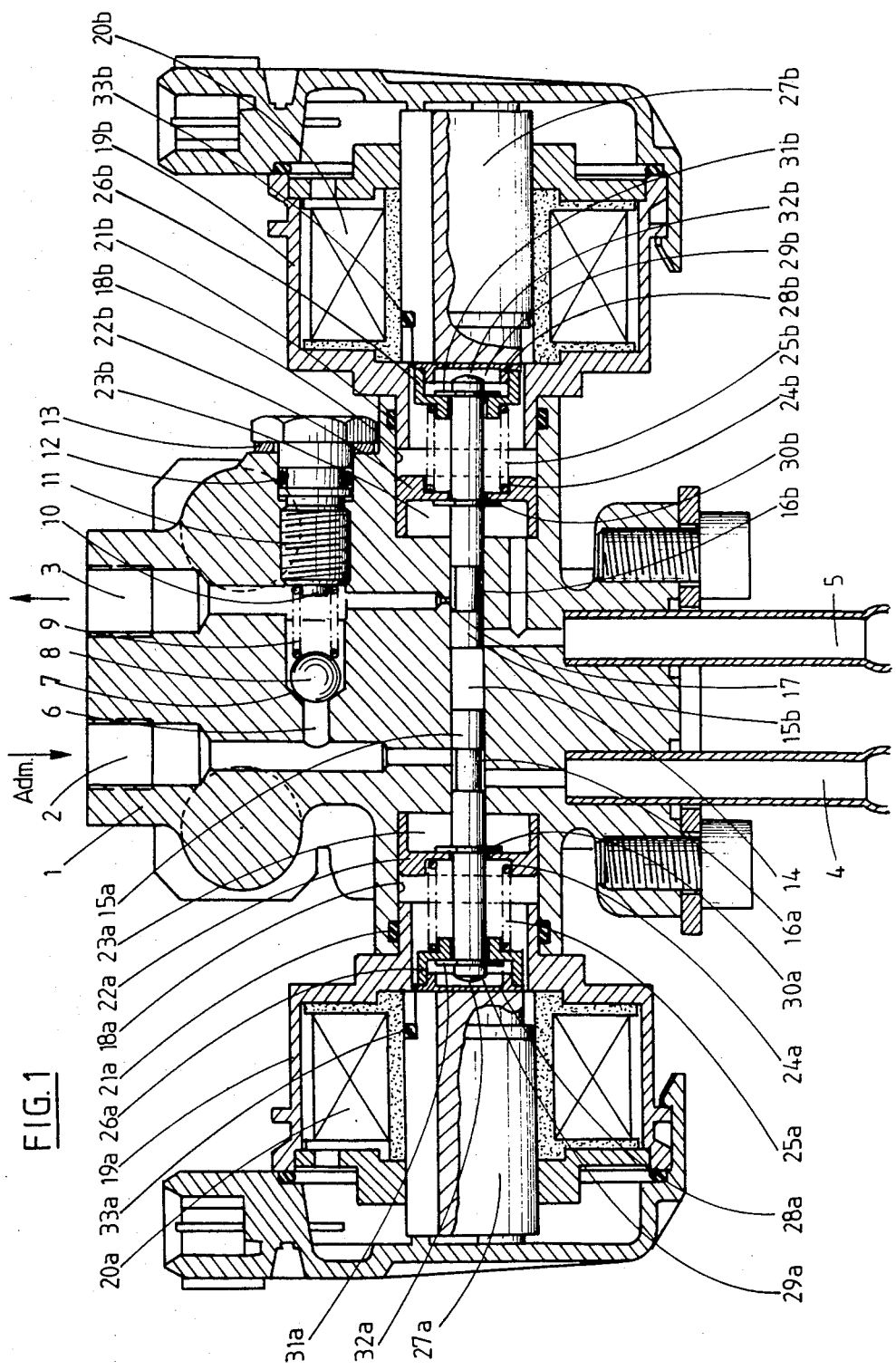
FIG. 1 is a sectional view of the distributor.

The height corrector of the invention comprises a body 1 in which are pierced an intake duct 2 connected to a pressurized supply source, a user duct 3 connected to the suspension cylinders of the vehicle and two exhaust or return ducts 4 and 5. The two ducts 2 and 3 are connected together by a duct 6 which comprises a seat 7 for a ball 8 forming a valving means; this ball is urged against its seat by a spring 9 which bears against the inner face 10 of a plug 11 fitted sealingly in the duct by means of seals 12 and 13 and closing off the orifice which served for piercing duct 6. The arrangement is such that when the pressure in duct 2 reaches a certain value, ball 8 moves away from its seat allowing the pressurized liquid to pass from the intake duct 2 into the user duct 3.

A transverse bore 14 connects together on the one hand the intake duct 2 and the exhaust duct 4 and, on the other hand, the user duct 3 to the exhaust duct 5. In this bore 14 are slidingly mounted two slide valves 15a and 15b which each comprise a groove 16a or 16b in the vicinity of their inner end. When slide valve 15a occupies its rest position, its groove 16a is located simultaneously opposite ducts 2 and 4 so that the intake is connected to the exhaust; this communication is interrupted if the slide valve is moved towards the middle of body 1, i.e. from left to right in FIG. 1. On the contrary, when slide valve 15b occupies its rest position, its groove 16b is moved away from duct 5, so that the user duct is isolated from the exhaust duct; communication is established if slide valve 15b is moved towards the middle of body 1, i.e. from right to left in FIG. 1. A constriction 17 is provided in the user duct 3, upstream of bore 14, for limiting the flow when the intake duct 2 is connected to the exhaust duct 5.

The body 1 of the corrector comprises two bores 18a and 18b into which bore 14 opens and in which the slide valves 15a and 15b extend. The bodies 19a and 19b of two electromagnets 20a and 20b are engaged respectively in bores 18a and 18b, sealing being provided by a seal 21a or 21b. The electromagnets 20a and 20b control the slide valves 15a and 15b respectively. This control is provided in a similar manner; therefore, only the control of slide valve 15a will be described hereafter, the corresponding elements for slide valve 15b bearing the index b instead of the index a in the drawings.

A cup 22a is engaged in bore 18a; its recess is turned inwardly of the bore so as to form a closed chamber 23a. The back of cup 22a comprises a recess 24a which serves as bearing surface for one of the ends of a return spring 25a. The other end of this spring bears against a cup 26a which itself bears against the end 28a of the core 27a of the electromagnet 20a, which defines a chamber 29a with cup 26a. The slide valve 15a passes through cups 22a and 26a. It comprises, inside chambers 23a and 29a, two stops 30a and 31a formed by washers engaged in grooves in the slide valve. In the rest position, these stops are in contact with the internal faces respectively of cups 22a and 26a and a clearance 32a exists between the end of slide valve 15a and the end 28a of core 27a.

The end portion of core 27a of electromagnet 20a is of reduced section and may slide in bore 18a. A resilient ring 33a bearing on the shoulder formed limits the outward movement of core 27a of electromagnet 20a when this latter is energized.

The operation of the height corrector which has just been described is as follows.

When the vehicle is in the low position, the detector emits a signal which energizes the electromagnet 20a whose core 27a is urged towards the outside of the electromagnet, i.e. towards the inside of the height corrector. Core 27a covers a first part of its travel while moving cup 26a and partially compressing spring 25a; then core 27a applies a shock to slide valve 15a and drives the slide valve and the cup while completing compression of spring 25a. The clearance 32a is then situated between washer 31a and cup 26a. Washer 30a is moved to the inside of chamber 23a. The travel of the assembly formed by core 27a, cup 26a, slide valve 15a and the two washers 30a and 31a is terminated when ring 33a comes into abutment against the body 19a of the electromagnet 20a. Groove 16a is moved and closes the circuit which connects the intake duct 2 to the exhaust duct 4. The pressure rises in the intake duct and ball 8 is urged against the action of spring 9, which puts the intake and user ducts into communication. The suspension cylinders are supplied under high pressure and cause the suspended part of the vehicle to rise.

When the electromagnet 20a is de-energized, the return spring 25a expands while moving first of all only cup 26a until it reaches washer 31a while taking up the play; it then continues its travel by driving slide valve 15a and the play 32a is again situated between the end of slide valve 15a and the end 28a of the core 27a of the electromagnet. Washer 30a comes into abutment at the same time as this core 27a. Groove 16a finds again its place in the circuit which connects the intake and the exhaust together; ball 8 urged back by its return spring 9 is applied to its seat 7 and the user circuit is isolated in the top position.

If the electromagnet 20b is energized by the detector, an equivalent operation results in opening the circuit which connects together the user duct and the exhaust duct. The pressure slowly drops in the suspension cylinders because of constriction 17 and the suspended part of the vehicle is lowered until the electromagnet 20b is de-energized.

Figure 2:
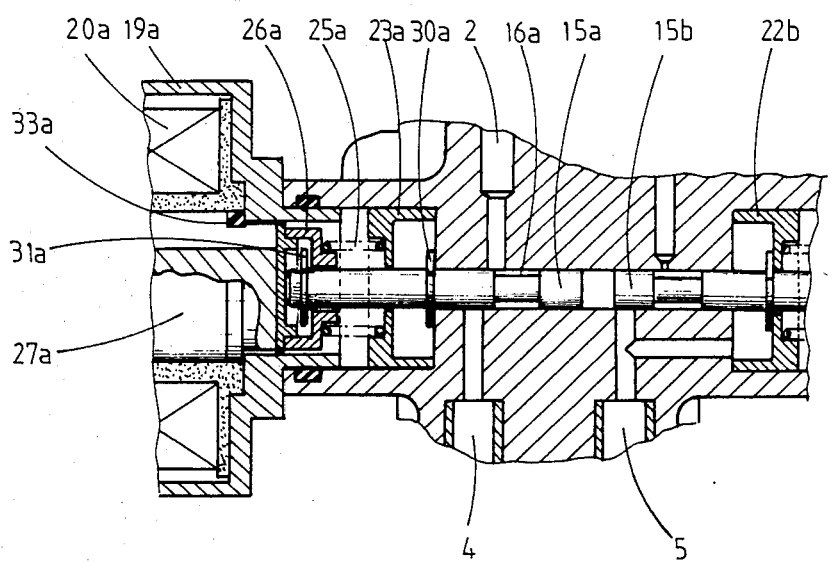
FIG. 2 is a sectional view of a detail of this distributor when one of the electromagnets is energized.
Figure 3:
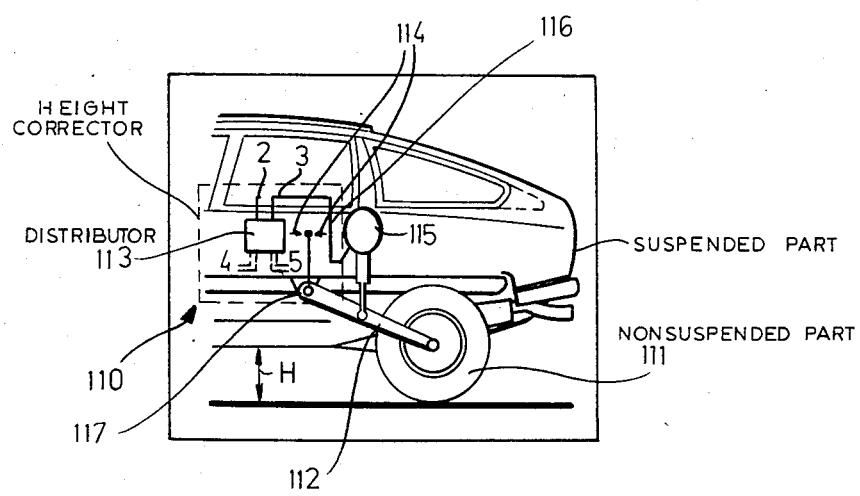
FIG. 3 is a diagram showing the system in which the distributor is used.

The distributor of FIGS. 1 and 2 has been shown at 113 in FIG. 3 for the vehicle 110 which has a height-correcting suspension 112 whose suspension cylinders 115 are connected to the user duct 116 of the distributor 113. The nonsuspended part is represented at 111, the suspended part at 117 and the means sensitive to the position of the suspended part of the vehicle with respect to the nonsuspended part thereof has been shown diagrammatically at 114 as a sensor arrangement.

What is claimed is:

1. In an electro-hydraulic height corrector for a motor vehicle comprising an hydraulic distributor having ducts connected to a pressurized supply source, to suspension cylinders and to an exhaust circuit, and means for connecting these different ducts together, and detecting means sensitive to the position of a suspended part of the vehicle with respect to a nonsuspended part thereof operatively connected to said distributor, the improvement wherein said distributor comprises two slide valves each connected to a core of an electromagnet, one of said slide valves being inserted in a fluid path directly connecting an intake duct to an exhaust duct and the other of said slide valves being inserted directly in a fluid path connecting a user duct to an exhaust duct, said slide valves being subject to the action of first and second resilient means tending to return the first slide valve to a position in which communication between the intake and the user ducts is established and the second slide valve to a position in which communication between the user and exhaust ducts is interrupted and a ball valve which is subject to the action of third resilient means and is inserted in a path connecting said intake duct and said user duct together, said user duct being connected to said suspension cylinder of said electromagnets being operated by said detecting means, the core of each electromagnet being connected to the corresponding slide valve by a lost motion connection and said resilient first and second means acting on the respective cores, said first and second resilient means each bearing on a cup which is controlled by the core of the respective electromagnet and engages a first stop integral with the respective slide valve, a second stop integral with the respective slide valve being engageable with a fixed element of the distributor so as to limit the travel of the respective slide valve and maintain a certain clearance in the rest position between an end of each slide valve and the respective core of the electromagnet, said second stop being formed by a washer engaged in a groove of the respective slide valve and movable inside a chamber formed in the fixed part of said distributor.

2. The improvement defined in claim 1 wherein said chamber is defined by a cup.